United States Patent [19]

Bauer et al.

[11] 3,884,693

[45] May 20, 1975

[54] LIGHT-SENSITIVE TRANSFER MATERIAL

[75] Inventors: Sigrid Bauer, Hahn, Taunus; Helga Sikora, Wiesbaden-Biebrich, both of Germany

[73] Assignee: Hoechst Aktiengesellschaft, Germany

[22] Filed: May 8, 1972

[21] Appl. No.: 251,351

[30] Foreign Application Priority Data

May 13, 1971 Germany .......................... 2123702

[52] U.S. Cl. .......................... 96/15; 96/83; 96/35.1; 96/91 R; 96/119 R; 96/33; 96/36.3; 96/36.4

[51] Int. Cl. .......................... G03c 11/12; G03c 7/16

[58] Field of Search ........ 96/91 R, 33, 28, 27, 35.1, 96/83, 15, 119 R, 35, 36.3

[56] References Cited

UNITED STATES PATENTS

| | | | |
|---|---|---|---|
| 2,650,877 | 9/1953 | Boyer | 96/83 |
| 2,852,371 | 9/1958 | Kendall | 96/83 |
| 3,057,722 | 10/1962 | Alles | 96/83 |
| 3,353,955 | 11/1967 | Sheldon | 96/35.1 |
| 3,408,191 | 10/1968 | Jeffers | 96/35.1 |
| 3,445,229 | 5/1969 | Webers | 96/35.1 |
| 3,469,982 | 9/1969 | Celeste | 96/35.1 |
| 3,481,736 | 12/1969 | Rutt | 96/28 |
| 3,573,918 | 4/1971 | Chambers et al. | 96/28 |
| 3,703,373 | 11/1972 | Alsup | 96/28 |

*Primary Examiner*—Norman G. Torchin
*Assistant Examiner*—John L. Goodrow
*Attorney, Agent, or Firm*—James E. Bryan

[57] ABSTRACT

This invention relates to a light-sensitive transfer material comprising a support, a light-sensitive thermoplastic layer, and a thin intermediate release layer which does not become tacky when heated at temperatures up to 150°C. and has a greater adhesion to said light-sensitive layer than to said support.

14 Claims, No Drawings

LIGHT-SENSITIVE TRANSFER MATERIAL

This invention relates to a light-sensitive material comprising a support and a light-sensitive layer suitable for dry transfer to another support.

Such a material is known from U.S. Pat. No. 3,469,982, for example. It is particularly used for the production of etch resists for printed circuits, intaglid printing forms, for chemical milling, and the like, and has considerable advantages for such applications over the usual formation of a layer from a solution or dispersion. The transfer is performed in such a manner that the bare surface of the light-sensitive layer — or the surface bared by removal of a possible protective film — is laminated with heating and pressure to the final support, and the temporary support, normally a transparent plastic film, is stirred off from the light-sensitive layer after exposure to light.

A color proofing method which functions according to a similar principle and in which a similar material is used, is described in published German patent application No. 1,923,989. According to this patent application, four light-sensitive layers colored in the four primary colors are produced on separate temporary supports and then transferred one after the other onto a final support, where they are exposed and developed. According to this process, however, transfer of the layer is performed in the wet, slightly swollen state, which means that only hydrophilic reproduction layers capable of swelling in water can be used. Further, the transferred layer must be dried before it can be subjected to further treatment.

The material first mentioned above and the dry transfer process have the disadvantage that for lamination of the lightsensitive layer to the final support heat is required in order to cause adequate adhesion. In order to be able to peel the temporary support from the copying layer afterwards, the adhesion between the temporary support and the copying layer must be less firm than that between the final support and the copying layer. Since the copying layer softens or becomes sticky during the lamination step, its adhesion to the temporary support may be increased, which may cause the copying layer to be damaged when the temporary support is peeled off.

Normally, the layer is exposed through the temporary support before the latter is stripped off. This means that the film must meet very high requirements as to transparency and optical homogeneity. Since the supporting film must have a certain minimum thickness in the interest of mechanical stability and tear strength of the transfer material, a considerable loss of resolving power occurs in any case during contact copying, which loss is caused by the distance between the original and the light-sensitive layer. When the supporting film is stripped off before exposure to light, direct contact, a condition for optimum sharpness of the copy, is achieved. In this case, however, the original very often adheres to the copying layer which has been softened during lamination, and can no longer be cleanly separated therefrom.

It was the object of the present invention to provide a lightsensitive transfer material which permits copying without loss of sharpness, but with neat separation of the original.

The present invention provides a light-sensitive transfer material comprising a support, a light-sensitive thermoplastic layer, and, if desired, a peelable cover sheet on the free surface of the light-sensitive layer. Between the support and the light-sensitive layer there is a thin release layer which does not become tacky upon being heated to temperature up to 150°C and has a better adhesion to the light-sensitive layer than to the support.

By means of the release layer contained in the material of the invention, it is achieved that the temporary support always can be cleanly stripped off with approximately the same expenditure of force, independently of the lamination temperature applied. Since the bared surface of the release layer does not soften or become tacky during lamination, it may be exposed to light in close contact with the original like any other light-sensitive layer which is not heated before copying. Since the release layer is very thin, i.e. about 0.1 to 5 $\mu$m, preferably 0.5 to 2 $\mu$m, it entails practically no loss of resolving power. When a suitable developer is used, it is removed together with the layer parts which are still soluble or have become soluble by exposure to light.

The release layer may consist of substances of very different nature, whose solubility characteristics advantageously are attuned to those of the light-sensitive layer. If the latter is to be developed with organic solvents or the vapors of such solvents, the release layer also should be soluble or at least swellable in these solvents. The same applies to the preferably used layers capable of development with aqueous alkaline solutions. In any case, the release layer should be soluble or swellable in the developer solution used.

High-polymer organic substances are especially suitable for the production of the release layer, because particularly uniform layers of the necessary small thickness can be produced therewith. Natural and synthetic high-polymer substances may be used, particularly those with an aliphatic chain in which no more than 50 per cent of the units contain aromatic substituents. Examples of suitable high-polymer substances are: gelatin, cellulose ethers, such as carboxy methyl cellulose or hydroxy ethyl cellulose, polyvinyl alcohol, polyvinyl pyrrolidone, polyacrylic acid, copolymers of styrene and maleic acid, copolymers of vinyl ether and maleic anhydride, polyacrylic esters, polymethacrylic esters, and maleic resins.

Alternatively, the release layer also may consist entirely or partially of low molecular weight film-forming organic substances, e.g. of wetting agents, such as saponin, water-soluble carbohydrates, such as saccharose, and the like, provided these substances do not soften or become tacky when heated to temperatures up to about 150°C.

When the light-sensitive layer to be used is a photopolymerizable layer sensitive to oxygen, a release layer of low permeability to the oxygen of the air is advantageously used. Layers of polyvinyl alcohol, polyvinyl pyrrolidone, gelatin, copolymers of methylvinyl ether and maleic anhydride, or saponin, and sucrose are suitable for this purpose, for example.

Negative-working as well as positive-working systems are suitable as light-sensitive copying layers. The following may be used, for example: photopolymer layers, photo-crosslinkable layers, layers sensitized with quinone diazides, diazonium compounds or azides, or polymer layers sensitized with certain heterocycles. Examples of suitable layers are described in U.S. Pat. No. 3,469,982.

It is essential that the light-sensitive layer be thermoplastic, i.e. that it softens or becomes tacky under the conditions prevailing during the lamination process which is performed at temperatures of up to about 150°C. Although a great number of the known light-sensitive layers, particularly of the photopolymer layers, have this property per se, part of the known layers must be modified for this purpose. This may be performed in a simple manner by the addition of thermoplastic binders, or, in the case of binder-containing layers, by the incorporation of compatible plasticizers.

Of the negative-working layers, those photopolymerizable layers are particularly suitable which substantially consist of a high molecular weight binder, polymerizable unsaturated compounds, and photoinitiators.

Further negative-working systems which are suitable may be obtained, for example, from high molecular weight cinnamic acid derivatives and chalcone compounds, and from cross-linkable binders sensitized with azides or diazonium salts.

Suitable polymerizable compounds are vinyl or vinylidene compounds capable of polymerizing upon the action of light. Such polymerizable compounds are known and described, for example, in U.S. Pat. Nos. 2,760,863 and 3,060,023. Examples are acrylic and methyacrylic esters, such as diglycerol diacrylate, guaiacol glycerol ether diacrylate, neopentyl glycol diacrylate, 2,2-dimethylol-butanol-(3)-diacrylate, and acrylates or methacrylates of hydroxy group-containing polyesters of the "Desmophen" type. Furthermore, prepolymers of such polymerizable compounds, for example prepolymers of allyl esters which themselves contain polymerizable groups, are suitable as additives to the photopolymer layers. Generally, those compounds are preferred which contain two or more polymerizable groups.

The photopolymer layer further contains at least one photoinitiator. Suitable initiators are hydrazones, five-membered nitrogencontaining heterocyclic compounds, mercapto compounds, pyrylium or thiopyrylium salts, multi-nuclear quinones, synergistic mixtures of different ketones, dye/redox systems, and certain acridine, phenazine, and quinoxaline compounds.

The binders preferably should be soluble or at least swellable in aqueous alkalies so that the layer can be developed with the preferred weakly alkaline developer solutions. Suitable binders are, for example: polyamides, polyvinyl acetates, polymethyl methacrylates, polyvinyl butyrals, unsaturated polyesters, copolymers of styrene and maleic anhydride, maleic resins, and terpene phenol resins.

Furthermore, dyes, pigments, polymerization inhibitors color-forming agents, and hydrogen donors may be added to the copying layers. In particular when the material is to be used in a color proofing process for multicolor printing plates, dyes or pigments must be added to the reproduction layer in sufficient quantities. Normally, these quantities range from about 1 to 30 percent by weight of the weight of the total solids content of the layer.

For the preparation of color proofs, the pigments or dyes employed are normally selected such that a set of light-sensitive materials in the three or four primary colors cyan, magenta, yellow and possibly black is obtained. The colors may be chosen either from the Kodak color scale, or according to the German standard colors DIN 16,508, DIN 16,509, and DIN 16,538. The pigments used may be those contained in the corresponding printing inks used for multi-color printing.

The pigments should be evenly dispersed in the copying layer and preferably should have a particle size below 5 $\mu$.

The following are examples of suitable dyes and pigments:

Victoria Pure Blue BO (C.I. 42,595), Auramin O (C.I. 41,000), Fat Black HB (C.I. 26,150), Monolite Yellow GT (C.I. Pigment Yellow 12), Permanent Yellow GR (C.I. 21,100), Permanent Yellow GG (C.I. Pigment Yellow 17), Permanent Yellow HR (C.I. Pigment Yellow 83), Permanent Carmine FBB (C.I. Pigment Red 146), Hostaperm Red ESB (C.I. Pigment Violet 19), Permanent Rubine FBH (C.I. Pigment Red 11) Fastel Pink B Supra (C.I. Pigment Red 81), Monastral Blue B (C.I. Pigment Blue 16), MOnastral Blue B (C.I. Pigment Blue 15), Monolite Fast Black B (C.I. Pigment Black 1), and carbon black. The references in brackets refer to the number or classification used in the Color Index, 2nd Edition.

Suitable positive-working layers are in particular those containing quinone diazides and resins, at least part of which should be alkali-soluble. Such layers are described in German Pat. No. 938,233 and No. 960,335, for example. Further suitable positive-working layers are those which contain, as sensitizers, high molecular weight thermoplastic polymers, particularly those with acid substituents, such as carboxylic acid, phosphonic acid, sulfonic acid, or N-aryl sulfonyl urethane groups, and multi-nuclear N-heterocyclic compounds, for example 9-phenyl-acridine, 9,10-dimethyl-benz(a)phenazine, 11-methoxy-dibenz(a,c)phenazine, 6,4′,4″-trimethoxy-2,3-diphenyl-quinoxaline, and 2,3-bis-(4′-methoxyphenyl)-5,6-dihydro-pyrazine. Layers of this type are described in copending application Ser. No. 213,154, filed Dec. 28, 1971.

Depending on their intended use, the reproduction layers may have a thickness of about 1 to 60 $\mu$m. When they are to be laminated to copper-containing supports, they may contain small quantities of organic sulfur compounds, e.g. 2-mercapto-benzthiazole, to improve their adhesion.

The sheet- or web-like flexible temporary support is disposed on the side of the copying layer coated with the release layer. It may consist of transparent material, e.g. plastic film or transparent paper, or of opaque material, e.g. pigmented plastic film, paper or metal foil. Other than in the case of the known transfer material, it even may be of advantage for the temporary support to be impermeable to actinic radiation, because in combination with a likewise impermeable cover sheet on the other side of the layer, a material thus can be produced which can be safely handled in daylight as long as the cover sheet or the support have not been removed. In many cases, it is advantageous to use films of certain plastic materials, e.g. polyester films, which are excellently suitable for this purpose owing to their specific mechanical properties, such as flexibility, dimensional stability, particularly smooth surface, and low adhesion.

Depending on its nature and the nature of the other component parts of the transfer material, the support may have a thickness from about 5 to several hundred μm, thicknesses of about 20 to 100 μm being normally preferred.

During storage, the light-sensitive copying layer preferably carries a thin cover sheet on the side away from the support to protect it from contamination and damage. The cover sheet may consist of the same or a similar material as the support. It must not necessarily be dimensionally stable, but must be more easily separable from the layer than the support. Suitable cover sheet materials are silicone paper, or polyolefin or polytetrafluoroethylene films, for example. The thickness of the cover sheet may range from about 5 to 100 μm.

The transfer material of the invention is produced either by applying a solution of the release layer to the support, drying it, and then coating the light-sensitive copying layer on top from a solvent which does not dissolve the release layer, or by coating the support with the release layer and coating the cover sheet with the light-sensitive layer, and then laminating the two sheets to one another. In this state, the transfer material according to the invention is insensitive and can be stored for a very long time.

The transfer material of the invention is employed as follows:

The cover sheet of the transfer material is removed and the light-sensitive layer is laminated to the support by applying pressure and heat. This may be done in the manner described in U.S. Pat. No. 3,469,982. The temporary support is then stripped off, and the copying layer is exposed in known manner in contact with an original and then developed. Development is also performed in known manner by wiping over with a solvent or a developer solution, preferably an aqueous alkaline solution, or by treatment with solvent vapor.

Depending on the intended use of the material, the bared areas of the support may be then treated with a preservative, or etched, or subjected to electroplating or electroless plating, or anodized in the usual manner.

The transfer material of the invention is mainly used for the production of printed circuits, of intaglio or relief printing plates, name plates, or integrated circuits, for chemical milling, and for the production of color proofs, offset printing plates and screen printing stencils.

The following examples illustrate various embodiments of the transfer material of the invention. The relation between parts by weight and parts by volume corresponds to that between grams and milliliters. Recipes I to IX preceding the examples are coating solutions used for the production of release layers for the material of the present invention.

| | | |
|---|---|---|
| Recipe I | | |
| 5.5 | p.b.w. | of gelatin |
| 0.035 | p.b.w. | of sodium alkyl aryl sulfonate |
| 1.82 | p.b.w. | ethanol |
| 92.645 | p.b.w. | of water |
| Recipe II | | |
| 1.5 | p.b.w. | of polyvinyl alcohol |
| 0.15 | p.b.w. | of ethoxylated phosphoric oleyl ester |
| 48.5 | p.b.w. | of water |
| Recipe III | | |
| 1.0 | p.b.w. | of carboxymethyl cellulose |
| 0.1 | p.b.w. | of sodium alkyl aryl sulfonate |
| 99.0 | p.b.w. | of water |
| Recipe IV | | |
| 5.0 | p.b.w. | of saponin |
| 95.0 | p.b.w. | of water |
| 0.02 | p.b.w. | of ethyl violet |

-Continued

| | | |
|---|---|---|
| Recipe V | | |
| 5.0 | p.b.w. | of sucrose |
| 5.0 | p.b.w. | of carboxymethyl cellulose |
| 0.5 | p.b.w. | of sorbic acid |
| 5.0 | p.b.w. | of saponin |
| 484.5 | p.b.w. | of water |
| Recipe VI | | |
| 3.0 | p.b.w. | of a copolymer of methyl vinyl ether and maleic anhydride ("Gantrez AN-119", a product of GAF Corporation) |
| 0.3 | p.b.w. | of saponin |
| 97.0 | p.b.w. | of water |
| Recipe VII | | |
| 10.0 | p.b.w. | of a copolymer of styrene and maleic acid, having an average molecular weight of 1,500 and an acid number of 300 |
| 1.0 | p.b.w. | of 1,4-butanediol |
| 89.0 | p.b.w. | of ethyleneglycol monobutyl ether |
| Recipe VIII | | |
| 5.0 | p.b.w. | of maleic resin of a melting point of 126 to 140°C and an acid number of about 165 ("Alresat 618 C", a product of Reichhold-Albert-Chemie AG., Wiesbaden-Biebrich, Germany) |
| 95.0 | p.b.w. | of ethyleneglycol monoethyl ether |
| Recipe IX | | |
| 3.0 | p.b.w. | of polybutyl methacrylate |
| 97.0 | p.b.w. | of ethyleneglycol monoethyl ether |

EXAMPLE 1

A coating solution consisting of

| | | |
|---|---|---|
| 1.4 | p.b.w. | of 1,1,1-trimethylol-ethane-triacrylate, |
| 1.4 | p.b.w. | of a copolymer of methyl methacrylate and methacrylic acid with an average molecular weight of 40,000 and an acid number of 90 to 115, |
| 0.2 | p.b.w. | of 1,6-di-hydroxyethoxy-hexane, |
| 0.05 | p.b.w. | of 9-phenyl-acridine, |
| 0.05 | p.b.w. | of 2-mercapto-benzthiazole, |
| 0.02 | p.b.w. | of Supranol Blue GL (C.I. 50,335), and |
| 13.0 | p.b.w. | of ethyleneglycol monoethyl ether, |

is whirler-coated onto a 37 μ thick, biaxially stretched polyethylene terephthalate film provided with a 0.5 to 1 μ thick release layer of gelatin (Recipe I) and dried. A 25 μ thick protective film of polyethylene is then applied to the surface thus obtained, by laminating it thereto under slight pressure and at room temperature. In this sandwich form, the light-sensitive copying layer may be stored for a very long time or shipped.

The procedure for the production of an eth resist is as follows:

After freeing it from the preserving agent, the copper surface of a copper/aluminum bimetal plate is roughened by rubbing it with abrasive (whiting), degreased with trichloroethylene, and freed from its oxide layer by immersing it for 30 seconds in a 1.5 percent nitric acid solution. For improving the adhesion, it is treated with a 2 percent alcoholic solution of 2-mercapto-benzthiazole. The protective polyethylene film of the light-sensitive material is then removed and the surface of the bared photoresist layer is then laminated to the dry metal surface. Subsequently, the polyester film base is stripped off. Exposure is performed for 1 minute under a negative original, using a 5 kilowatt xenon point light lamp of Staub, Neu-Isenburg, Germany. The material is developed with an aqueous alkaline solution (pH 11.3) consisting of

| | | |
|---|---|---|
| 15.0 | p.b.w. | of sodium metasilicate nonahydrate, |

-Continued

| | | |
|---|---|---|
| 3.0 | p.b.w. | of "Polyglycol 6,000", |
| 0.6 | p.b.w. | of levulinic acid, |
| 0.3 | p.b.w. | of strontium hydroxide octahydrate, and |
| 1,000.0 | p.b.w. | of water |

and then etched for 2.5 to 3 minutes with an iron-III-chloride etching solution.

After removal of the etch resist with methylene chloride, the bimetal plate of copper and aluminum is ready for printing.

Instead of the polyester support, non-transparent materials, e.g. paper, metal foils, or pigmented films, also may be used as support materials. Processing is the same in these cases.

EXAMPLE 2

A coating solution consisting of

| | | |
|---|---|---|
| 1.4 | p.b.w. | of a copolymer of methyl methacrylate and N-(p-toluenesulfonyl)-carbamic acid-(β-methacryloyloxy)-ethyl ester, in a ratio by weight of 65 : 35 (acid number 60), |
| 2.0 | p.b.w. | of a hexamethyacrylate obtained by reaction of pentaerythritol trimethacrylate with sebacic dichloride, |
| 0.1 | p.b.w. | of 6,4′,4″-trimethoxy-2,3-diphenyl-quinoxaline, |
| 0.05 | p.b.w. | of 2-mercapto-benzthiazole, |
| 0.02 | p.b.w. | of Supranol Blue GL, and |
| 19.0 | p.b.w. | of ethyleneglycol monoethyl ether, |

is whirler-coated onto a 37 μ thick, biaxially stretched polyethylene terephthalate film provided with a 1-2 μ thick layer of gelatin (Recipe I) and dried.

This surface is then laminated under slight pressure with a 25 μ thick protective film of polyethylene.

The procedure for the production of a printed circuit is as follows:

The copper surface of a support consisting of a plastic plate and a copper skin laminated thereto is freed from the preserving agent, and the surface is then roughened by rubbing with abrasive (whiting), degreased with trichloroethylene, freed from its oxide layer by immersion in 1.5 per cent nitric acid, and treated with a 2 percent alcoholic solution of 2-mercapto-benzthiazole to improve the adhesion.

Subsequently, the protective polyethylene film of the lightsensitive material is removed, and the bared surface of the photopolymer layer is laminated to the dry metal surface. The polyester film is then stripped off. The material is exposed for 3 minutes under a negative original to a tubular exposure device manufactured by Messrs. Moll, Solingen-Wald, Germany, which comprises 13 fluorescent tubes of the type Philips TL-AK-40 W/05 on an area of 60 × 60 cm, and then developed for 1 minute with the developer described in Example 1.

Etching is performed for 20 minutes with an iron-III-chloride solution of 42° Be.

EXAMPLE 3

A coating solution consisting of

| | | |
|---|---|---|
| 2.5 | p.b.w. | of a copolymer of methyl methacrylate and methacrylic acid with an average molecular weight of 32,000 and an acid number of 137, |
| 0.01 | p.b.w. | of Supranol Blue GL, |
| 0.2 | p.b.w. | of 9-phenyl-acridine, |

-Continued

| | | |
|---|---|---|
| 0.25 | p.b.w. | of polyoxyethylene sorbitane monolaurate ("TWEEN 21", a product of Atlas Chem. Ind.), and |
| 7.5 | p.b.w. | of ethyleneglycol monoethyl ether |

is applied to a 37 μ thick, biaxially stretched polyester film provided with a 1–2 μ thick release layer of carboxymethyl cellulose (Recipe III) and, after drying, laminated to a polyethylene film.

For the production of an etch resist, the copper surface of a support consisting of a plastic plate with a copper skin laminated thereto and pretreated according to Example 2, is laminated with heating to the light-sensitive layer after stripping the polyethylene film off.

Subsequently, the polyester film is removed and the lightsensitive layer is exposed for 10 minutes under a positive original to a tube exposure device as in Example 2. Development is achieved by 2½ minutes' treatment with ethyleneglycol monoethyl ether containing about 10 per cent of water and 10 per cent of concentrated sulfuric acid. This is followed by etching for 15 minutes with an iron-III-chloride etching solution of 42°Be.

The etch resist can be removed by treatment with alcohol.

EXAMPLE 4

A coating solution consisting of

| | | |
|---|---|---|
| 3.0 | p.b.w. | of 2,3,4-trihydroxy-benzophenone ester of the naphthoquinone-(1,2)-diazide-(2)-5-sulfonic acid, |
| 10.0 | p.b.w. | of m-cresol-formaldehyde-novolak ("Alnovol 429 K", a product of Reichhold-Albert-Chemie AG., Wiesbaden-Biebrich, Germany), |
| 80.0 | p.b.v. | of butyl acetate, |
| 1.3 | p.b.w. | of dibutyl phthalate, and |
| 0.3 | p.b.w. | of Methyl Violet BB (Schultz' Farbstofftabellen, 7th Edition Vol. 1 (1931), page 327, No. 783), |

is applied to a 37 μ thick biaxially stretched polyester film provided with a 1–2 μ thick release layer of carboxymethyl cellulose (Receipe III) and dried. (Weight of the dry layer. 10 g/m$^2$)

The etch resist is produced according to the preceding examples. A copper surface is laminated with the light-sensitive copying layer and the polyester base is then removed. The material is exposed for 6 minutes under a positive original to a 8 kilowatt xenon lamp and developed with 10 to 15 per cent aqueous trisodium phosphate solution. This is followed by etching with a $FeCl_3$ solution of 42° Be.

EXAMPLE 5

A coating solution consisting of

| | | |
|---|---|---|
| 70.0 | p.b.w. | of 1,1,1-trimethylol-ethane-triacrylate, |
| 70.0 | p.b.w. | of a copolymer of methylmethacrylate and methacrylic acid, having an average molecular weight of 40,000 and an acid number of 90 to 115, |
| 10.0 | p.b.w. | of diethyleneglycol monohexyl ether, |
| 2.0 | p.b.w. | of 9-phenyl-acridine, |
| 1.25 | p.b.w. | of 4-dimethylamino-benzalacetone, |
| 5.0 | p.b.w. | of Supranol Blue GL, and |
| 325.0 | p.b.w. | of ethyleneglycol monoethyl ether |

is whirler-coated onto a 25 μ thick, biaxially stretched polyester film provided with a 1-2 μ thick release layer of polyvinyl alcohol (Recipe II). After drying, the layer weight is 17 $g/m^2$. Subsequently, the surface is laminated with a polyethylene film for protecting it from dust.

For identification, this dry resist film is designated as X.

For comparison, the same coating solution is applied directly to a 25 μ thick polyester film and the film sample is designated as Y. It is similar in its structure to the films described in the examples of U.S. Pat. No. 3,469,982. The weight of the lightsensitive copying layer is also 17 $g/m^2$. For protection, the layer surface is again laminated with a 25 μ thick polyethylene film.

The following procedure is applied to determine the resolving power:

In both cases, the protective polyethylene layer is removed and the bared surface is laminated under slight pressure at about 120°C to brushed aluminum grained to a depth of 2.5 μ.

In the case of film X, the polyester film is then removed.

Both samples are exposed for 1 minute under a screened testing plate (Neg. No. 1391) manufactured by Messrs, Dr. J. Heidenhain, Traunreut, Germany, which is used for measuring the resolving power.

The light-source used is a xenon point lamp according to Example 1.

For differentiating the image areas and non-image areas, film sample X is immediately wiped over with the developer described in Example 1, and film sample Y after the polyester base has been removed therefrom. Next the films are rinsed with water and dried.

Resolving power.

| | |
|---|---|
| Film sample X: | 20.8 lines/mm (factor 0.048 mm) |
| Film sample Y: | 0.98 lines/mm (factor 1.02 mm) |

EXAMPLE 6

A coating solution consisting of

| | | |
|---|---|---|
| 8.0 | p.b.w. | of trimethylol propane triacrylate, |
| 14.0 | p.b.w. | of maleic resin ("Alresat 618 C", a product of Reichhold-Albert-Chemie A.G.) |
| 0.2 | p.b.w. | of 6,4',4''-trimethoxy-2,3-diphenyl-quinoxaline, |
| 0.1 | p.b.w. | of tri-[4-(3-methyl-phenylamino)-phenyl]-methylacetate, and |
| 30.0 | p.b.w. | of ethyleneglycol monomethyl ether, |

is whirler-coated onto a polyester film coated with polyvinyl alcohol (Recipe II), so that the layer weight is 20 $g/m^2$.

The cleaned copper surface of a support consisting of a plastic plate and a copper skin laminated thereto is then laminated with the resulting dry resist film, the polyester film base is stripped off from the sandwich, and the photopolymer layer is exposed for 1 minute under a negative original as described in Example 1. Development is performed by wiping over with the solution indicated in Example 1, followed by etching for 30 minutes with an iron-III-chloride solution of 42° Be.

EXAMPLE 7

A coating solution consisting of

| | | |
|---|---|---|
| 60.0 | p.b.w. | of ethyleneglycol monoethyl ether, |
| 14.0 | p.b.w. | of trimethylol propane triacrylate, |
| 14.0 | p.b.w. | of a copolymer of methyl methacrylate and methacrylic acid having an average molecular weight of 35,000 and an acid number of about 125, |
| 2.0 | p.b.w. | of diethyleneglycol monohexyl ether, |
| 0.2 | p.b.w. | of 9-phenyl-acridine, |
| 0.07 | p.b.w. | of 4-dimethylamino-benzalacetone, |
| 0.2 | p.b.w. | of the dye indicated in Example 6, and |
| 1.4 | p.b.w. | of a copolymer of styrene and maleic anhydride, having an average molecular weight of 1,500, an acid number of 300, and a softening temperature of 120°C, |

is applied to a sheet of rigid polyvinyl chloride coated with polyvinyl alcohol (Recipe II), so that the coating weight is 17.5 $g/m^2$.

The copying layer is then laminated to anodized aluminum the oxide layer of which is dyed with Supranol Blue GL, the base film is removed, and exposure is performed for 1.5 minutes under a positive original as in Example 1. Development is the same as in Example 1 and etching is then performed for 45 seconds with 20 per cent aqueous soda lye. After removal of the etch resist with methyl ethyl ketone, an image of sharp contrast appears which can be used as a name plate.

EXAMPLE 8

A film sample according to Example 7 is laminated to a planar glass plate which has been degreased with acetone, the base film is peeled off, and the copying layer is exposed as in Example 1 for 3 minutes under a line original of sharp contrast and then developed with the solution indiated in Example 1. This is followed by 3 minutes' after-exposure and 2 minutes' etching of the bared glass surface with a 48 percent aqueous solution of hydrofluoric acid. After rinsing with water, the etch resist is removed by means of methyl ethyl ketone.

EXAMPLE 9

A film sample is produced with the coating solution described in Example 7, adjusting the weight of the dry layer to 5.5 $g/m^2$, and is then laminated to a brass/-chromium plate which has been freed from the preserving agent. The film base is stripped off and the copying layer is exposed for 3 minutes as in Example 1 under a positive original. Development is performed as in Example 1 and the bared chromium is etched away within 2 minutes by means of a solution of 42.4 per cent of $CaCl_2$, 9.8 per cent of $ZnCl_2$, 10.8 percent of HCl, and 37.0 percent of $H_2O$, whereupon the etch resist is removed by means of methyl ethyl ketone. The plate is then wiped over with 1 per cent phosphoric acid and inked up with greasy ink. The multi-metal plate is ready for printing in this form.

EXAMPLE 10

A coating solution consisting of

| | | |
|---|---|---|
| 60.0 | p.b.w. | of ethyleneglycol monoethyl ether, |
| 14.0 | p.b.w. | of trimethylol propane triacrylate, |
| 14.0 | p.b.w. | of a copolymer of methyl methacrylate and methacrylic acid having an average molecular weight of 35,000 and an acid number of about 125, |
| 0.2 | p.b.w. | of 1,2-benzacridine, |
| 2.0 | p.b.w. | of diethyleneglycol monohexyl ether, |
| 0.07 | p.b.w. | of 4-dimethylamino-benzalacetone, |
| 0.2 | p.b.w. | of 2-mercapto-benzoxazole, and |
| 0.2 | p.b.w. | of the dye indicated in Example 6, |

is applied to a polystyrene film coated with polyvinyl alcohol (Recipe II) to a dry coating weight of 17.0 g/m².

The copying layer is then laminated to stainless steel degreased with acetone, the film base is stripped off, and exposure is performed for 3 minutes under a negative original according to Example 1. The resulting material is developed by wiping over with the solution used in Example 1, etched with iron-III-chloride solution of 42° Be (3 minutes at 80°C), briefly wiped over with 30 per cent nitric acid and rinsed with water, and the etch resist is then removed by means of methyl ethyl ketone.

The relief image thus produced has a depth of about 200 μ and can be used as a printing plate.

EXAMPLE 11

A film element according to Example 10 is laminated to a polyacetal sheet ("Hostaform C", a product of Farbwerke Hoechst A.G., Frankfurt-Hoschst, Germany) which has been roughened by scouring powder, the film base is stripped off, and the copying layer is exposed for 3 minutes as described in Example 1 under a line original. Development is performed as in Example 1 and the bared surface is etched for 30 minutes with concentrated hydrochloric acid. After rinsing with water, the etch resist is removed by means of methyl ethyl ketone. The relief image produced has a depth of about 100 μ and may be used as a printing plate.

EXAMPLE 12

A film element according to Example 10 is laminated to a cleaned zinc plate suitable for powderless etching, the film base is stripped off, and the copying layer is exposed for 2 minutes under a negative original as described in Example 1. The material is then developed with the developer mentioned in Example 1 and the bared zinc surface is etched for 5 minutes with 6 percent nitric acid. The form thus obtained is suitable for book printing.

EXAMPLE 13

0.2 part by weight of the reaction product from 1 mole of 2,2,4-trimethyl-hexamethylene diisocyanate and 2 moles of isopropanol is added to the coating solution described in Example 7, and the solution is applied to a polyester film coated with polyvinyl alcohol (Recipe II) and dried. Layer weight: 18 g/m². The copying layer is then laminated under slight pressure at about 120°C to a trimetal plate consisting of layers of aluminum, copper, and chromium, which has been freed from the preserving agent. The film base is then stripped off and the copying layer is exposed for 3 minutes under a positive original as in Example 1. Development is performed as described in Example 1, and the chromium is then etched for 3 minutes with the etching solution used in Example 9.

The etch resist is removed by means of methyl ethyl ketone and the surface of the plate is wiped over with 1 percent phosphoric acid and inked up with greasy ink. The trimethyl plate is ready for printing in this form.

EXAMPLE 14

A coating solution consisting of

| | | |
|---|---|---|
| 5.6 | p.b.w. | of the reaction production from 1 mole of 2,2,4-trimethyl-hexamethylene diisocyanate and 2 moles of 2-hydroxy-ethyl-methacrylate, |
| 5.6 | p.b.w. | of a terpolymer from methyl methacrylate, n-hexyl methacrylate, and methacrylic acid (ratio by weight 150 : 750 : 360) having an acid number of 173 to 178, |
| 0.5 | p.b.w. | of triethyleneglycol diacetate, |
| 0.1 | p.b.w. | of 9-phenyl-acridine, |
| 0.06 | p.b.w. | of the dye mentioned in Example 6, and |
| 30.0 | p.b.w. | of ethyleneglycol monoethyl ether |

is applied to a cellulose acetate film coated with polyvinyl alcohol (Receipe II) and dried. The layer weight is 17.6 g/m². A printed circuit is produced as described in Example 6.

EXAMPLE 15

A coating solution according to Example 10 is applied to a polyethylene film so that the weight of the dry layer is 17.5 g/m².

In a second process step, a solution according to Recipe VII is applied to a 25 μ thick polyester film and dried. The weight of the dry layer is 1–2 g/m².

The light-sensitive copying layer is then laminated to the release layer, which is also capable of development with an aqueous alkaline developer, and a film element is thus obtained which can be used for the production of an etch resist by the method described in the preceding examples.

EXAMPLE 16

A 100 μ thick sheet of pigmented rigid polyvinyl chloride and a sheet of paper coated with polyethylene and thus made water-proof, are coated with a solution according to Recipe II and dried.

The coating solution indicated in Example 7 is then whirlercoated on top of the precoat; the weight of the dry layer may be adjusted as desired, between 12 and 60 g/m². The surface of the copying layer is protected from dust by lamination with a 25 μ thick polyethylene film.

The procedure for the production of an etch resist is similar to that of the initially described examples.

EXAMPLE 17

A coating solution consisting of

| | | |
|---|---|---|
| 1.4 | p.b.w. | of the binder described in Example 1, |
| 1.4 | p.b.w. | of trimethylol propane triacrylate, |
| 0.04 | p.b.w. | of 9-phenyl-acridine, |
| 0.1 | p.b.w. | of methyl phthalyl ethyl glycolate ("Santicizer M 17", a product of Monsanto Chemical Co.), |
| 3.25 | p.b.w. | of ethyleneglycol monoethyl ether, |
| 1.5 | p.b.w. | of acetone, and |
| 0.48 | p.b.w. | of a pigment dispersion prepared by grinding 16.0 p.b.w. of Monastral Blue B (C.I. Pigment Blue 15), 10.0 p.b.w. of the binder described in Example 1, and 1.0 p.b.w. of dioctyl ester of the sodium sulfosuccinic acid, as well as 85.0 parts by weight of ethylene glycol monoethyl ether, |

is applied by means of a wire wound stainless steel rod to a 75 μ thick biaxially stretched polyethylene terephthalate film provided with a 1 to 2 μ thick release layer of polyvinyl alcohol (Recipe II) and dried. The weight of the dry layer is 13 g/m².

The production of an etch resist is the same as in the above-described examples.

EXAMPLE 18

A coating solution consisting of

| | | |
|---|---|---|
| 8.0 | p.b.w. | of a prepolymer of the diallyl isophthalate, prepared according to US Patent No. 3,030,341 ("Dapon M", a product of FMC Corporation, New York, N.Y., USA), |
| 2.0 | p.b.w. | of pentaerythritol triacrylate, |
| 90.0 | p.b.w. | of xylene, and |
| 0.5 | p.b.w. | of a mixture of 4,4'-dimethoxy-benzil, Michler's ketone, and xanthone in a ratio by weight of 1 : 1 : 4 |

is applied by means of a wire wound rod to a 37 μ thick, biaxially stretched polyester film provided with a 1–2 μ thick layer of polybutyl methacrylate (Recipe IX) and dried.

A printed circuit is produced as follows:

The above-described transfer material is laminated to the cleaned copper surface of a support consisting of a glass fiber-reinforced plastic plate and a copper skin laminated thereto, the polyester film is stripped off, and the material is then exposed for 1 minute under a negative original, using the apparatus described in Example 1.

For development, the material is immersed for 1 minute in xylene, then sprayed with xylene, and dried with warm air. Subsequently, the material is etched for 20 minutes with an iron-III-chloride solution of 42° Be. The resist image is removed by spraying with warm methylene chloride.

EXAMPLE 19

A coating solution consisting of

| | | |
|---|---|---|
| 15.0 | p.b.w. | of a copolymer of methyl methacrylate, butyl methacrylate, and acrylated glycidyl methacrylate (1:1:1) prepared according to Example 9 of U.S. Pat. No. 3,418,295, |
| 2.34 | p.b.w. | of triethylene glycol diacrylate, |
| 1.41 | p.b.w. | of 2-tert.-butyl-anthraquinone, and |
| 100.0 | p.b.w. | of trichloroethylene |

is applied to a 25 μ thick polypropylene film provided with a 1 to 2 μ thick release layer of maleic resin (Recipe VIII) and dried. The weight of the light-sensitive copying layer is about 8 g/m².

The surface is then protected from dust and mechanical damage by laminating it with a polyethylene film.

The procedure for the production of an etch resist is similar to that of the preceding examples.

EXAMPLE 20

The advantage of a release layer is demonstrated by the following test:

The protective polyethylene film of a transfer material according to U.S. Pat. No. 3,469,982 ("Riston" type 5, a product of E. I. DuPont de Nemours & Com., Wilmington, Del. USA) is removed and the bared surface is applied to a cleaned copper support in the manner recommended by the manufacturer.

The material is exposed under a screened testing plate as described in Example 5 and then developed with trichloroethylene. The resolving power is 5 lines/mm (factor 0.200 mm).

The procedure of a second test is similar, except that the polyester base is stripped off before exposure. In this case, the original lies directly on the surface of the layer.

Exposure and development are the same as above. When trying to determine the resolving power, it is found out that the screen elements do not have the same thickness (=depth) or are partially washed away during development.

Due to the non-uniformity of the resist image, a determination of the resolving power is not possible. This results from the fact that parts of the original adhered to the layer surface during exposure, thus causisng differences in the hardening of the image areas.

This is a characteristic phenomenon of all thermoplastic copying layers.

EXAMPLE 21

A coating consisting of

| | | |
|---|---|---|
| 14.0 | p.b.w. | of trimethylol propane triacrylate, |
| 14.0 | p.b.w. | of a copolymer of methyl methacrylate and methacrylic acid having an average molecular weight of 35,000 and an acid number of 120 to 125, |
| 1.4 | p.b.w. | of the styrene/maleic anhydride copolymer mentioned in Example 7, |
| 0.2 | p.b.w. | of 9-phenyl-acridine, |
| 2.0 | p.b.w. | of diethyleneglycol monohexyl ether, |
| 0.07 | p.b.w. | of 4-dimethylamino-benzalacetone, |
| 0.2 | p.b.w. | of Supranol Blue GL, and |
| 60.0 | p.b.w. | of ethyleneglycol monoethyl ether |

is applied to a 25 μm thick, biaxially stretched polyester film provided with a 1–2 μm thick release layer of polyvinyl alcohol (Recipe II). After drying, the layer has a weight of 17.5 g/m². Subsequently, a monofil "Perlon" fabric carrying a gelatin precoat on one surface is applied in such a manner that the photopolymer layer adheres firmly to one surface of the fabric, whereas the other surface is covered by the gelatin layer. Presensitized screen printing material in this form can be stored for a long time.

For the production of a stencil for screen printing, the following procedure is used:

The polyester base is removed, and the material is then exposed for 2 minutes under a positive original as described in Example 1 and developed by the method used in the same example. The stencil thus produced excels by its high resistance to abrasion and excellent sharpness of the contours.

Instead of precoating the fabric with gelatin, the original fabric may be backed with a film and used in this form. Suitable films are, e.g., polyester or polypropylene films, with or without an adhesion-improving layer.

In this case, the lamination procedure is as follows:

The screen printing fabric selected is placed on a 25 μ thick polypropylene film, e.g., and a photopolymer layer anchored by a release layer to a flexible support is superimposed thereon. The sandwich thus formed is then passed through a pair of pressure rolls one of which is heated to 90°C, and a laminate is thus formed.

For the production of the stencil, the film base is peeled off, and the material is then exposed for 2 minutes under a positive original as described in Example 1.

Subsequently, the polypropylene film is removed and the material is developed by wiping as in Example 1.

The stencil produced in this manner has the same good quality as the one described above.

EXAMPLE 22

A coating solution consisting of

| | | |
|---|---|---|
| 55.0 | p.b.w. | of gelatin, dissolved in |
| 18.2 | p.b.w. | of ethanol, |
| 0.35 | p.b.w. | of sodim alkyl aryl sulfonate, and |
| 926.45 | p.b.w. | of water, |

is applied, by means of a wire wound stainless steel rod, to several sheets of 75 $\mu$ thick polyethylene terephthalate film in a manner such that the dry coating has a weight of 1 – 2 g/m². After drying, the sheets are set aside for later use.

Subsequently, four light-sensitive coating solutions are prepared as follows:
I.

| | | |
|---|---|---|
| 14.0 | p.b.w. | of a copolymer of methyl methacrylate and methacrylic acid with an average molecular weight of 35,000 and an acid number of 90 - 115, |
| 14.0 | p.b.w. | of trimethylol propane triacrylate, |
| 0.4 | p.b.w. | of 9-phenyl-acridine, |
| 2.0 | p.b.w. | of diethyleneglycol monohexyl ether, |
| 0.25 | p.b.w. | of 4-dimethylamino-benzal acetone, |
| 13.0 | p.b.w. | of ethyleneglycol monoethyl ether, and |
| 0.6 | p.b.w. | of Victoria Pure Blue BO (C.I. 42,595). |

II. The same solution as described at I), except that the blue dye is replaced by

| | | |
|---|---|---|
| 0.8 | p.b.w. | of Grasol Fast Rubin 2 BL (a product of Messrs. Geigy, Basel, Switzerland). |

III. The same solution as described at I), except that the dye is replaced by

| | | |
|---|---|---|
| 0.8 | p.b.w. | of Auramine O (C.I. 41,000). |

IV. The same solution as described at I), except that the dye is replaced by

| | | |
|---|---|---|
| 1.0 | p.b.w. | of Fat Black HB (C.I. 26,150). |

Each of the coating solutions I, II, III, and IV is then applied separately by means of a wire wound stainless steel rod to the coated side of one of the gelatin-subbed polyester sheets described above.

Coating weights after drying for 2 minutes at 100°C are between 13 and 15 g/m².

For color proofing, the resulting four light-sensitive materials are used as follows:

The cyan-colored film is placed, coated side down, on a suitable receptor sheet, such as a polyester film pretreated in accordance with published German patent application No. 1,228,414, and laminated to it at 82°C with moderate pressure.

The laminate is allowed to cool and the first-mentioned polyester base is stripped away. Subsequently, the light-sensitive material is placed in register with the cyan printer of a set of halftone color separation negatives and exposed to a high-intensity light source, such as a NuArc "Flip Top" Plate Maker, Model FT 26 L, having a xenon light source.

The image is developed with the following aqueous solution:

| | | |
|---|---|---|
| 15.0 | p.b.w. | of sodium meta-silicate nonahydrate, |
| 3.0 | p.b.w. | of "Polyglycol 6000", |
| 0.6 | p.b.w. | of levulinic acid, |
| 0.3 | p.b.w. | of strontium hydroxide octahydrate, and |
| 1,000.0 | p.b.w. | of water. |

Subsequently, the magenta-colored light-sensitive material is applied to the receptor sheet covered by the cyan-colored image, the polyester base is stripped off, the light-sensitive layer is exposed in register, and finally developed. Exposure is under the magenta printer of the set of halftone silver separation negatives.

In the same manner, a yellow color separation is produced from the yellow-colored reproduction material, and, finally, a black color separation from the black-colored reproduction material.

An accurate colored reproduction of the original is thus obtained.

EXAMPLE 23

Four light-sensitive photopolymer solutions are prepared by mixing a stock solution A containing

| | | |
|---|---|---|
| 14.0 | p.b.w. | of the methyl methacrylate/methacrylic acid copolymer used in Example 22, |
| 14.0 | p.b.w. | of trimethylol propane triacrylate, |
| 0.4 | p.b.w. | of 4',4''-dimethoxy-2,3-diphenyl-quinoxaline, |
| 2.0 | p.b.w. | of "Polyethylene glycol 1,500" |
| 15.0 | p.b.w. | of acetone, and |
| 32.5 | p.b.w. | of ethyleneglycol monoethyl ether |

with the pigment dispersions stated below.

The respective pigment dispersions are added in the following amounts each to 8.05 parts by weight of the stock solution A:

| | |
|---|---|
| Cyan | 0.50 p.b.w. |
| Magenta | 0.80 p.b.w. |
| Yellow | 1.00 p.b.w. |
| Black | 0.50 p.b.w. |

The individual pigment dispersions have the following compositions:

| | | |
|---|---|---|
| Cyan: | | |
| 85.0 | p.b.w. | of ethyleneglycol monoethyl ether, |
| 1.0 | p.b.w. | of the dioctyl ester of sodium sulfosuccinic acid as a wetting agent, |
| 16.0 | p.b.w. | of Cinquasia Blue B (C.I. Pigment Blue 15), and |
| 10.0 | p.b.w. | of the binder used in the stock solution A. |
| Magenta | | |
| 49.0 | p.b.w. | of ethyleneglycol monoethyl ether, |
| 1.6 | p.b.w. | of the dioctylester of sodium sulfosuccinic acid, |
| 12.0 | p.b.w. | of Permanent Carmine FBB (C.I. Pigment Red 146), and |
| 23.75 | p.b.w. | of the binder used in the stock solution A. |
| Yellow | | |
| 52.0 | p.b.w. | of ethyleneglycol monoethyl ether, |
| 1.5 | p.b.w. | of the dioctyl ester of sodium sulfosuccinic acid, |
| 7.5 | p.b.w. | of Permanent Yellow GG (C.I. Pigment Yellow 17), |
| 7.5 | p.b.w. | of Permanent Yellow GR (C.I. Pigment Yellow 13, No. 21,100), and |
| 21.5 | p.b.w. | of the binder used in the stock solution A. |
| Black | | |
| 10.0 | p.b.w. | of ethyleneglycol monoethyl ether, |
| 10.0 | p.b.w. | of carbon black, and |

-Continued

| | | |
|---|---|---|
| 2.45 | p.b.w. | of the binder used in the stock solution A. |

The dispersions are prepared as follows:

The pigment is wetted with ethyleneglycol monoethyl ether and the wetting agent, the binder is added in the form of a 35 percent solution in ethyleneglycol monoethyl ether, and the mixture is ground in a ball mill or other appropriate mill to the desired grind gauge reading.

The colored sensitizing solutions are each coated onto a 75 μ thick polyester film provided with a polyvinyl alcohol precoat having a dry coating weight of 1–2 $g/m^2$.

The light-sensitive layer preferably has a thickness of 12 to 14 μ. It is protected against damage by a polyethylene cover sheet.

The light-sensitive materials are used to make to four-color proof by the process techniques described in Example 22.

EXAMPLE 24

A set of light-sensitive materials colored in the four primary colors - cyan, magenta, yellow, and black - is prepared according to Example 23.

Then each of the four colored sheets is laminated to a separate lithographic printing surface, e.g. a subbed polyester receptor sheet as used in Example 22. The sandwiches so formed are passed between a pair of heated pressure rollers, cooled briefly, and then the temporary polyester bases are peeled off.

The four light-sensitive printing plates thus produced are exposed through the appropriate color separation negatives of a set of cyan, magenta, yellow and black printers, developed as described in Example 22, treated with a 1 per cent aqueous phosphoric acid solution, and protected with an aqueous solution of gum arabic.

The resulting printing plates are used to print separate image components on a standard offset press with corresponding printing inks, successively building up a multi-color reproduction.

EXAMPLE 25

A light-sensitive coating solution is prepared according to Example 23, using the magenta pigment, and whirler-coated onto a polyvinyl alcohol-subbed, 25 μ thick polyester film to a dry coating weight of 13 $g/m^2$.

The light-sensitive material is placed, coated side down, on an anodized aluminum foil and laminated to it at 120°C with pressure. After cooling, the polyester base is stripped off.

The printing plate obtained is then exposed through a high contrast photographic negative, using a UV light source (e.g. a carbon arc lamp), and developed as described in Example 22.

After treatment with 1 percent phosphoric acid solution, the plate is ready for printing on a standard offset press.

Similar results are obtained with brushed, sandblasted, etched or silicated aluminum carriers or stainless steel supports acting as receptor sheets.

While this process permits the fabrication of full page printing plates, the process also can be used for adding and/or inserting image areas into already processed printing plates.

Since the light-sensitive layer is developed with aqueous alkali, there is no damage possible to already existing photopolymerized or photo-crosslinked image areas.

EXAMPLE 26

A light-sensitive coating solution is prepared according to Example 23, using the magenta pigment, and whirler-coated onto a 75 μ thick, polyvinyl alcohol - subbed polyester sheet to a dry coating weight of 13.5 $g/m^2$. The light-sensitive material is placed, coated side down, on an anodized aluminum foil and laminated to it at 120°C with pressure. After cooling, the polyester base is stripped off. The printing plate thus obtained is subsequently exposed through a high contrast photographic negative, using a UV light source (e.g. a carbon arc lamp) and developed according to Example 22. After treatment with a 1 percent phosphoric acid solution, the plate is ready for printing on a standard offset press.

From this plate, 100,000 copies are obtained without any wear observed.

Comparable results are obtained with brushed, sandblasted, etched or silicated aluminum carries as well as with stainless steel supports acting as receptor sheets.

EXAMPLE 27

A sheet of polyester, polystyrene, or polyethylene film, or of polyethylene-coated paper, is coated with an aqueous solution of polyvinyl alcohol to produce a 1-2 μ thick release layer on the treated surface. The thus precoated materials are set aside for later use.

A stock solution A is prepared from the following components:

| | | |
|---|---|---|
| 14.0 | p.b.w. | of a styrene/maleic anhydride copolymer with an average molecular weight of 20,000 and an acid number of 180, |
| 14.0 | p.b.w. | of trimethylol ethane triacrylate, |
| 2.0 | p.b.w. | of methyl phthalyl ethyl glycolate, |
| 0.4 | p.b.w. | of xanthone, |
| 0.1 | p.b.w. | of benzil, |
| 0.1 | p.b.w. | of Michler's ketone, |
| 15.0 | p.b.w. | of acetone, and |
| 32.5 | p.b.w. | of ethyleneglycol monoethyl ether. |

8.05 respective parts by weight of filtered stock solution A are mixed with pigment dispersions in the following amounts:

| | |
|---|---|
| Cyan | 0.5 part by weight, |
| Magenta | 0.8 part by weight, |
| Yellow | 1.0 part by weight, |
| Black | 0.5 part by weight, |

the dispersions having the compositions stated in Example 23.

These colored solutions are coated each to a weight of 13.0 $g/m^2$ onto one of the previously subbed sheets, by means of a wire wound stainless steel rod, and dried for 2 minutes at 100°C.

The colored light-sensitive materials are then used to make a full 3 or 4 color print reproduction by photographic techniques according to the process steps described in Example 22.

EXAMPLE 28

A coating composition is prepared by mixing together

| | | |
|---|---|---|
| 2.5 | p.b.w. | of polyvinyl alcohol, |
| 0.35–0.50 | p.b.w. | of an anionic wetting agent (e.g. "Duponol RA", a product of DuPont) |
| 0.20–2.0 | p.b.w. | of finely divided silica ("Aerosil OK 412", a product of Degussa), and |
| 77.15–77.0 | p.b.w. | of water |

to make up 100 parts by weight of solution.

The silica acts as a delusterant. After mixing, the dispersion is coated onto a sheet of clear polyester film with a number 6 wire wound rod to give a dry coating weight of 1.8 g/m². Then the sheet is put aside to be used later.

A photopolymerizable coating solution is prepared from the following components:

| | | |
|---|---|---|
| 14.0 | p.b.w. | of the methyl methacrylate/methacrylic acid copolymer of Example 22, |
| 14.0 | p.b.w. | of trimethylol propane triacrylate, |
| 2.0 | p.b.w. | of polyethylene glycol |
| 0.4 | p.b.w. | of 6-methoxy-2,3-diphenyl-quinoxaline, |
| 15.0 | p.b.w. | of acetone, and |
| 32.5 | p.b.w. | of ethyleneglycol monoethyl ether. |

After stirring to produce a clear solution, four colored coating solutions are prepared by adding the appropriate pigment dispersions described in Example 23. Using a number 12 wire wound rod, the colored coating solutions are applied to the previously subbed polyester sheets to a dry coating weight of about 13 g/m².

The resulting light-sensitive materials are then used to make a multi-color reproduction according to the process described in Example 22.

EXAMPLE 29

Several sheets of polyester or polystyrene film are coated with a release layer as described in paragraph 1 of Example 28.

Subsequently, a photopolymerizable coating solution is prepared from the following components:

| | | |
|---|---|---|
| 14.0 | p.b.w. | of the methyl methacrylate/methacrylic acid copolymer described in Example 22, |
| 14.0 | p.b.w. | of trimethylol ethane triacrylate, |
| 2.0 | p.b.w. | of polyethylene glycol, |
| 0.2–2.0 | p.b.w. | of silica, as described in Example 28, |
| 0.4 | p.b.w. | of 9-phenyl-acridine, |
| 15.0 | p.b.w. | of acetone, and |
| 32.5 | p.b.w. | of ethyleneglycol monoethyl ether. |

After thorough mixing, the different pigment dispersions used in Example 23 are added to produce four different colored coating solutions. The colored solutions are applied to the previously subbed carrier sheets to produce a dry coating weight of about 13 g/m². The light-sensitive materials thus obtained are used to make a multicolored image reproduction according to the process described in Example 22.

The colored proof thus produced has a matte image surface due to the silica added.

It will be obvious to those skilled in the art that many modifications may be made within the scope of the present invention without departing from the spirit thereof, and the invention includes all such modifications.

What is claimed is:

1. Light-sensitive transfer material comprising a support, a light-sensitive thermoplastic layer, and a thin intermediate release layer of low permeability to the oxygen of the air which does not become tacky when heated at temperatures up to 150°C. and has a greater adhesion to said light-sensitive layer than to said support.

2. Material according to claim 1 including a strippable cover sheet on the free surface of said light-sensitive layer.

3. Material according to claim 1, in which the release layer has a thickness of 0.1 to 5 $\mu$m.

4. Material according to claim 1, in which the release layer is soluble or swellable in aqueous or aqueous alkaline solutions.

5. Material according to claim 1, in which the release layer is a film-forming organic substance.

6. Material according to claim 5, in which the release layer is a high-polymer organic substance with an aliphatic chain which contains no more than 50 per cent of units with aromatic substituents.

7. Material according to claim 1, in which the light-sensitive thermoplastic layer is a photopolymer layer.

8. Material according to claim 1, in which the light-sensitive thermoplastic layer contains from 1 to 30 percent by weight of a dye or pigment.

9. Material according to claim 1, in which the release layer is polyvinyl alcohol.

10. Material according to claim 1, in which the release layer is gelatin.

11. Material according to claim 1, in which the release layer contains a wetting agent.

12. A process for the production of a copy on a support which comprises laminating the support, with heating, to a free surface of a thermoplastic light-sensitive layer on a temporary support, stripping said temporary support, and image-wise exposing and developing said lightsensitive layer, said light-sensitive layer and temporary support having a thin intermediate release layer of low permeability to the oxygen of the air which does not become tacky when heated at temperatures up to 150°C and has a greater adhesion to said light-sensitive layer than to said support.

13. A process according to claim 12, in which the light-sensitive layer is a photoresist layer and the final support is etched or electroplated after development of the image.

14. A process according to claim 12, including laminating the first of a set of light-sensitive layers in the three or four primary colors to a final support, exposing it under the appropriate color separation of a multicolor image, and developing it to form a first color separation copy, and then producing the other color separation copies on the same final support by lamination, exposure in register, and development.

* * * * *

Notice of Adverse Decision in Interference

In Interference No. 99,991, involving Patent No. 3,884,693, S. Bauer and H. Sikora, LIGHT-SENSITIVE TRANSFER MATERIAL, final judgment adverse to the patentees was rendered Feb. 10, 1982, as to claims 1, 3-9, and 12.

[*Official Gazette July 12, 1983.*]